(12) United States Patent
Hälleberg et al.

(10) Patent No.: US 8,751,118 B2
(45) Date of Patent: Jun. 10, 2014

(54) METHOD AND SYSTEM FOR DRIVING OF A VEHICLE

(75) Inventors: Roger Hälleberg, Nacka (SE); Anders Jensen, Gnesta (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 13/515,909

(22) PCT Filed: Dec. 16, 2010

(86) PCT No.: PCT/SE2010/051401
§ 371 (c)(1), (2), (4) Date: Jun. 14, 2012

(87) PCT Pub. No.: WO2011/075067
PCT Pub. Date: Jun. 23, 2011

(65) Prior Publication Data
US 2012/0253616 A1    Oct. 4, 2012

(30) Foreign Application Priority Data
Dec. 17, 2009    (SE) ........................................ 0950973

(51) Int. Cl.
*B60K 17/06*    (2006.01)

(52) U.S. Cl.
USPC .............................................. 701/51; 701/66

(58) Field of Classification Search
USPC ..................................................... 701/51, 66
See application file for complete search history.

(56) References Cited

U.S. PATENT DOCUMENTS 5,754,968 A *    5/1998 Hedstrom ....................... 701/66
7,987,034 B2    7/2011 Taffin

FOREIGN PATENT DOCUMENTS

| EP | 0 947 738 A1 | 10/1999 |
|---|---|---|
| EP | 1 031 768 A2 | 8/2000 |
| EP | 1 860 352 A2 | 11/2007 |
| EP | 2 050 989 A1 | 4/2009 |
| GB | 2 091 358 | 7/1982 |
| JP | 62-261746 | 11/1987 |
| KR | 1999-0040799 | 6/1999 |
| KR | 2005-0085048 | 8/2005 |
| WO | WO 2004/048818 A1 | 6/2004 |

OTHER PUBLICATIONS

International Search Report dated Mar. 23, 2011 issued in corresponding international application No. PCT/SE2010/051401.
Japanese Office Action, dated Oct. 22, 2013, issued in corresponding Japanese Patent Application No. 2012-544437. English translation. Total 2 pages.
Russian Federation Official Action, dated Oct. 1, 2013, issued in corresponding Russian Patent Application No. 2012130152/11(047413), filed Dec. 16, 2010. Total 4 pages.
The Korean Intellectual Property Office Notice of Office Action dated Aug. 8, 2013 issued in corresponding Korean Patent Application No. 2012-7018808 (with English translation).

* cited by examiner

*Primary Examiner* — Mary Cheung
*Assistant Examiner* — Yuen Wong
(74) *Attorney, Agent, or Firm* — Ostrolenk Faber LLP

(57) ABSTRACT

A method for control of a vehicle's gearbox which is connected to a combustion engine and can be set to a number of different transmission ratios. When the vehicle is running in a low transmission ratio and at an engine speed below that at which the torque plateau for the low ratio is reached, in a situation where there is a reduced need for power output to propel the vehicle, determine a speed parameter for the vehicle, switch the gearbox to a higher transmission ratio than the low ratio when the speed parameter fulfills a first criterion.

18 Claims, 4 Drawing Sheets

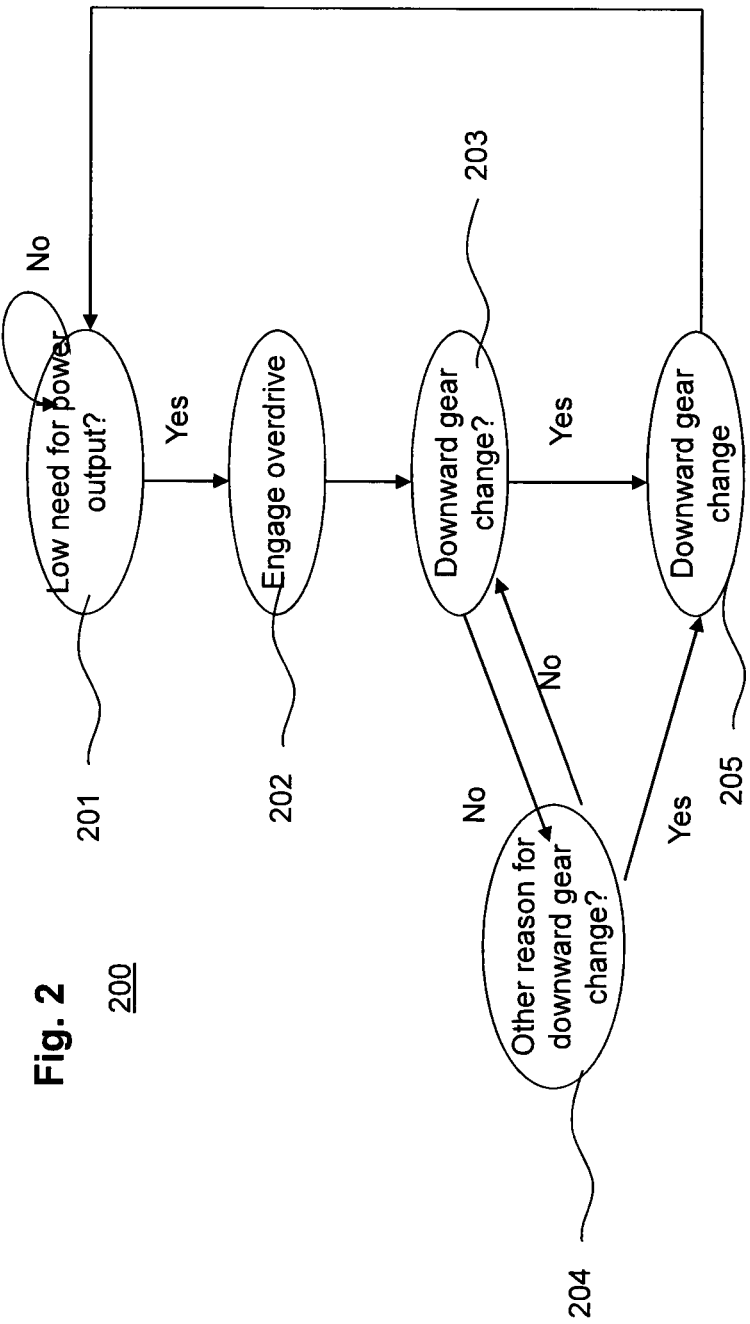

METHOD AND SYSTEM FOR DRIVING OF A VEHICLE

CROSS-REFERENCE TO RELATED APPLICATIONS

The present application is a 35 U.S.C. §§371 national phase conversion of PCT/SE2010/051401, filed Dec. 16, 2010, which claims priority of Swedish Application No. 0950973-8, filed Dec. 17, 2009, the contents of which are incorporated by reference herein. The PCT International Application was published in the English language.

FIELD OF THE INVENTION

The present invention relates to a method and a system for control of a gearbox connected to a combustion engine. In particular, the invention relates to a method and a system for control of a gearbox, which gearbox can be set to a number of different transmission ratios, in a situation where there is a reduced need for power output to propel a vehicle.

BACKGROUND TO THE INVENTION

In driving of heavy vehicles such as trucks, buses and the like, vehicle economy has over time become an ever greater factor in the profitability of the activity in which the vehicle is used. Apart from its procurement cost, the main costs involved in routine operation of a heavy vehicle normally comprise pay for the driver, repair and maintenance costs, and fuel for propulsion of the vehicle.

Depending on the type of vehicle, the impact of different factors may vary, but fuel consumption is generally a major item of expenditure, and since the capacity utilisation of heavy vehicles is often high, involving a large overall fuel consumption, every possible way of reducing fuel consumption has a positive effect on profitability.

On long-distance runs it is particularly important to optimise fuel consumption. To this end there are long-distance vehicles characterised by a typical engine cruising speed for a certain vehicle cruising speed. Typical vehicle cruising speeds, depending on the region or type of road, may for example be 80 km/h, 85 km/h or 89 km/h.

For heavy vehicles in general, various different power train configurations are available. But, since it is often desirable that such vehicles be drivable as comfortably as possible for the driver, they are often provided with automatically operated gearboxes such that gear changes are controlled by the control system usually incorporated in the vehicle.

The fact that automatic gear change systems in heavy vehicles are usually controlled by the control system makes it possible, a possibility which is often applied, to use a control arrangement whereby the control of the engine and gearbox is conducted partly on the basis of commands from the vehicle driver but also to a large extent by the control system. For this reason the control system often also incorporates functions for improving fuel consumption by as far as possible effecting gear changes and gear choices in as fuel-economising a way as possible.

An example of such a function is a function whereby when the vehicle is on a downgrade, its engine is disconnected from its powered wheels when no torque contribution is required to maintain the vehicle's speed. The vehicle's power train is subsequently reconnected when, for example, the driver presses the accelerator pedal or the brake pedal.

Although the aforesaid disconnecting function may work well in many cases, there are still situations where the fuel consumption of vehicles powered by a combustion engine can be further reduced.

SUMMARY OF THE INVENTION

An object of the present invention is to propose a method for control of a gearbox of a vehicle whereby the latter's fuel consumption can be reduced.

The present invention pertains to a method for control of a vehicle's gearbox connected to a combustion engine and capable of being set to a number of different transmission ratios. When the vehicle is running in a low transmission ratio and at an engine speed below the torque plateau for said low ratio, in a situation where there is a reduced need for power output to propel said vehicle, the method comprises:

determining a speed parameter for said vehicle, switching the gearbox to a higher transmission ratio than said low ratio when said speed parameter fulfils a first criterion.

This affords the advantage that the vehicle can be run in an overdrive until said speed parameter fulfils a first criterion, thereby allowing running in overdrive to take place for as long as possible or for as long as is deemed appropriate before a downward gear change to a higher transmission ratio (a lower gear) takes place.

The speed parameter may for example be a derivative for the vehicle's speed, i.e. the vehicle's acceleration, in which case gear changing may for example take place when the acceleration (positive or negative) deviates from a threshold value or reference value. Alternatively, the speed parameter may for example be the vehicle's speed, in which case a certain speed deviation, e.g. a speed decrease, may be allowed. For example, gear changing may take place when the speed decrease reaches a threshold value.

It is also possible, during running of the vehicle, for the engine to be arranged to contribute appropriate motive force up to the (reduced) motive force (power output) which the engine can deliver at its speed at the time in order to thereby also increase the capacity utilisation of the overdrive. For example, the vehicle may be driven with overdrive engaged on a downgrade which results in a reduced need for power output, whereby a contribution is required from the engine for it to be possible for the vehicle's speed to be maintained, or it may be driven for as long as possible without its speed deviating too far from said reference speed.

The present invention may also, where possible without the speed decrease becoming too great, or until the speed decrease reaches a threshold value as above, be used for driving of the vehicle with the engine trailing, i.e. the engine being "trailed" by the vehicle with fuel injection switched off and consequently no fuel consumption. Trailing of the engine at low engine speed affords the advantage of reducing its brake torque as compared with trailing at higher engine speeds.

Upward gear changing to and downward gear changing from said low transmission ratio (overdrive) may be arranged to be at least partly controlled by a function for prediction of appropriate gear change timing, e.g. by determination of road topography ahead of the vehicle in order to make best possible use of said overdrive (low transmission ratio).

Further characteristics of the present invention and advantages thereof will be indicated by the detailed description of examples of embodiments set out below and the attached drawings.

BRIEF DESCRIPTION OF THE DRAWINGS

FIG. 2 is a flowchart illustrating an example of a method for control of a gearbox according to an example of an embodiment of the present invention.

DETAILED DESCRIPTION OF EXAMPLES OF EMBODIMENTS

The term overdrive is normally taken to mean a gear in which the output shaft of the gearbox rotates faster than the engine shaft.

In the description and claims set out below, however, the term overdrive is confined to denoting a gear in which the vehicle, at its cruising speed, runs at an engine speed which is below that at which the torque plateau for the gear is reached. This means that maximum torque will not be available in such a gear, rendering that gear unusable except in situations where the need for motive force is reduced.

Figure 1A:
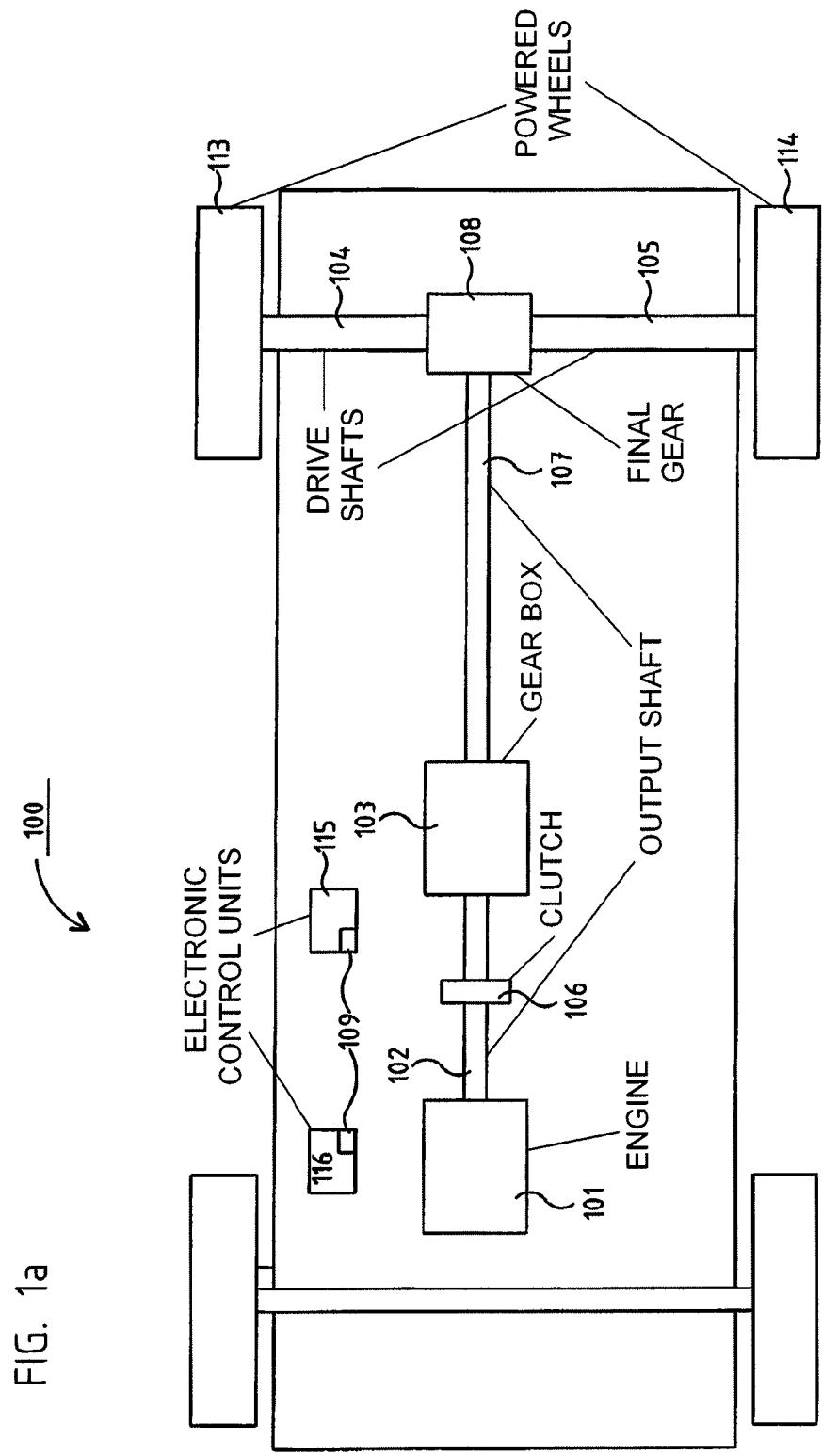
FIG. 1a depicts a power train in a vehicle in which the present invention may with advantage be used.

FIG. 1a depicts an example of a power train in a heavy vehicle 100, e.g. a truck, bus or the like, according to an example of an embodiment of the present invention. The vehicle 100 schematically depicted in FIG. 1a comprises only one axle with powered wheels 113, 114 but the invention is also applicable in vehicles which have more than one axle provided with powered wheels. The power train comprises a combustion engine 101 connected in a conventional way, via an output shaft 102 of the engine 101, usually via a flywheel (not depicted), to an automatically operated gearbox 103 via a clutch 106.

However, heavy vehicles used largely in agriculture or on motorways are usually provided not with automatic gearboxes in a traditional sense but with "manual" gearboxes in which gear changing is controlled by a control system. This is partly because manual gearboxes are substantially less expensive to manufacture, but also because of their greater efficiency and consequently lower fuel consumption.

The clutch 106 in the embodiment depicted takes the form of an automatically controlled clutch of conventional type, e.g. of disc type. The opening/closing of the clutch is controlled by the vehicle's control system. This is also usual in the case of a manually controlled clutch, such that gear changes after the vehicle has been set in motion take place with closed clutch by appropriate control of the engine during gear changing.

Control systems in modern vehicles usually consist of a communication bus system comprising one or more communication buses for connecting together a number of electronic control units (ECUs), or controllers, and various components located on the vehicle. Such a control system may comprise a large number of control units, and the responsibility for a specific function may be divided between two or more of them. For the sake of simplicity, FIG. 1a depicts only two such electronic control units 115, 116 which in this embodiment control respectively the engine 101 and clutch 106 (in the case with automatically controlled clutch) and the gearbox 103 (two or more from among engine, gearbox and clutch may alternatively be arranged to be controlled by just one control unit). The control of engine, clutch and gearbox by the control units 115, 116 normally depends on signals both from one or the other and also from other control units. Control units of the type depicted are normally adapted to receiving sensor signals from various parts of the vehicle, e.g. from gearbox, engine, clutch and/or other control units or components of the vehicle. The control units are further adapted to delivering control signals to various parts and components of the vehicle, e.g. engine, clutch and gearbox, for their control. The present invention may be implemented in any of the above control units, or in some other suitable control unit in the vehicle's control system.

The control of various parts and components of the vehicle, e.g. choice of gears, is often governed by programmed instructions.

These instructions take typically the form of a computer program which, when executed in a computer or control unit, causes the computer/control unit to effect desired forms of control action, e.g. method steps according to the present invention. The computer program usually takes the form of computer program products 109 which are stored on a digital storage medium 121 (see FIG. 1b), e.g. ROM (read-only memory), PROM (programmable read-only memory), EPROM (erasable PROM), flash memory, EEPROM (electrically erasable PROM), a hard disc unit etc., in combination with or in the control unit, and are executed by the control unit. The vehicle's behavior in a specific situation can thus be adjusted by altering the computer program's instructions.

Figure 1B:
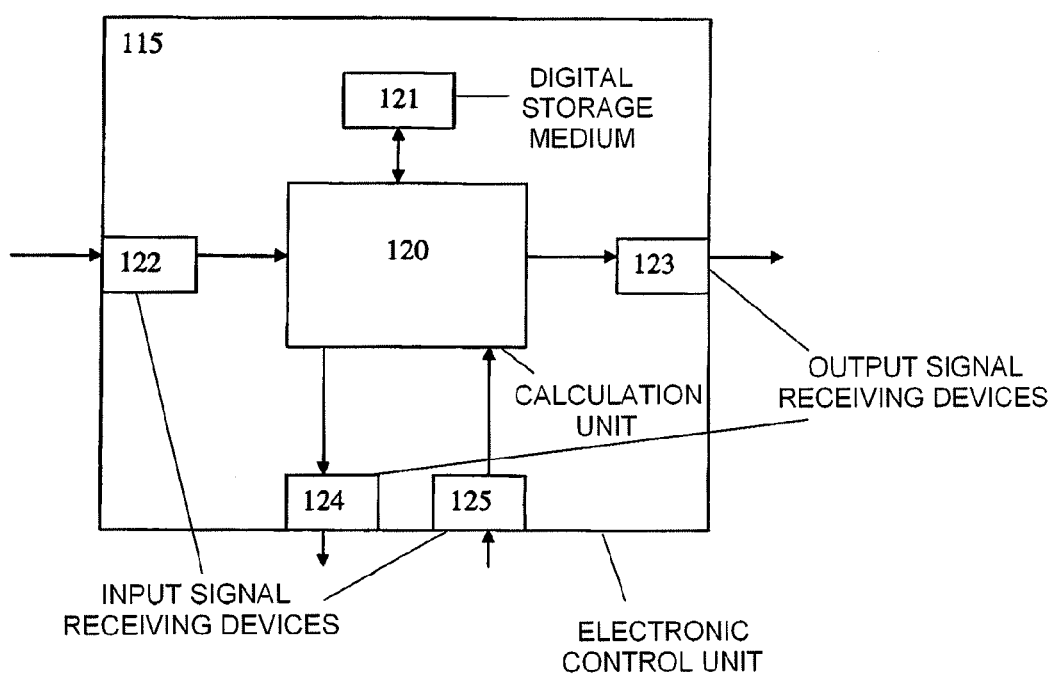
FIG. 1b depicts an example of a control unit in a vehicle control system.

An example of a control unit (the control unit 115) is depicted schematically in FIG. 1b and may comprise a calculation unit 120 which may take the form of substantially any suitable type of processor or microcomputer, e.g. a circuit for digital signal processing (Digital Signal Processor, DSP), or a circuit with a predetermined specific function (Application Specific Integrated Circuit, ASIC). The calculation unit 120 is connected to a memory unit, the digital storage medium, 121, which is situated in the control unit 115 and which provides the calculation unit 120 with, for example, the stored program code and/or the stored data which the calculation unit 120 needs in order to be able to perform calculations. The calculation unit 120 is also adapted to storing partial or final results of calculations in the memory unit.

Each of the connections to the devices for receiving and sending input and output signals may take the form of one or more from among a cable, a data bus, e.g. a CAN (Controller Area Network) bus, a MOST (Media Orientated Systems Transport) bus or some other bus configuration, or a wireless connection.

The vehicle 100 further comprises drive shafts 104, 105 connected to its powered wheels 113, 114 and driven by an output shaft 107 from the gearbox 103 via a final gear 108, e.g. a conventional differential.

The depicted gearbox 103 in the vehicle 100 is provided with at least one overdrive gear adapted to having an operating range below the torque plateau for that gear at the vehicle's cruising speed as described above. This means that the vehicle normally cannot be driven with such a type of overdrive engaged, since the engine's speed at the operating point will usually be too low to be able to deliver enough torque, and in addition, as soon as the need for motive force increases, the engine will drop to a lower speed at which still less power is available and there is risk of the engine stopping.

The object of such an overdrive is instead to minimise parasitic losses, and hence fuel consumption, in operating conditions where there is a reduced or no need for power output. This is utilised by the present invention, and an example of an embodiment of a method according to the present invention is illustrated in FIG. 2.

FIG. 2 is a flowchart showing steps performed during control of an engine according to an example of a method 200 of the present invention. Step 201 determines whether there is a low need for power output. Such a low need may typically be determined if the power output needed to propel the vehicle at its speed at the time is lower than a threshold value.

If the vehicle is for example being driven on a downgrade, the power output needed to propel it is reduced because the earth's power of attraction by gravity on downgrades (as opposed to upgrades) contributes a positive (forward) motive force component such that the need for power output from the engine to propel the vehicle may decrease markedly or even cease altogether. The power output extractable via the overdrive (the available torque) may therefore in many cases be sufficient to make it possible to drive the vehicle at an unchanged or substantially unchanged speed despite the low engine speed.

In such a situation, switching the gearbox to overdrive, step 202, reduces the engine's need for fuel, resulting in a fuel saving, while at the same time the engine speed goes down to a very low value and the level of noise from the engine drops.

Figure 3:
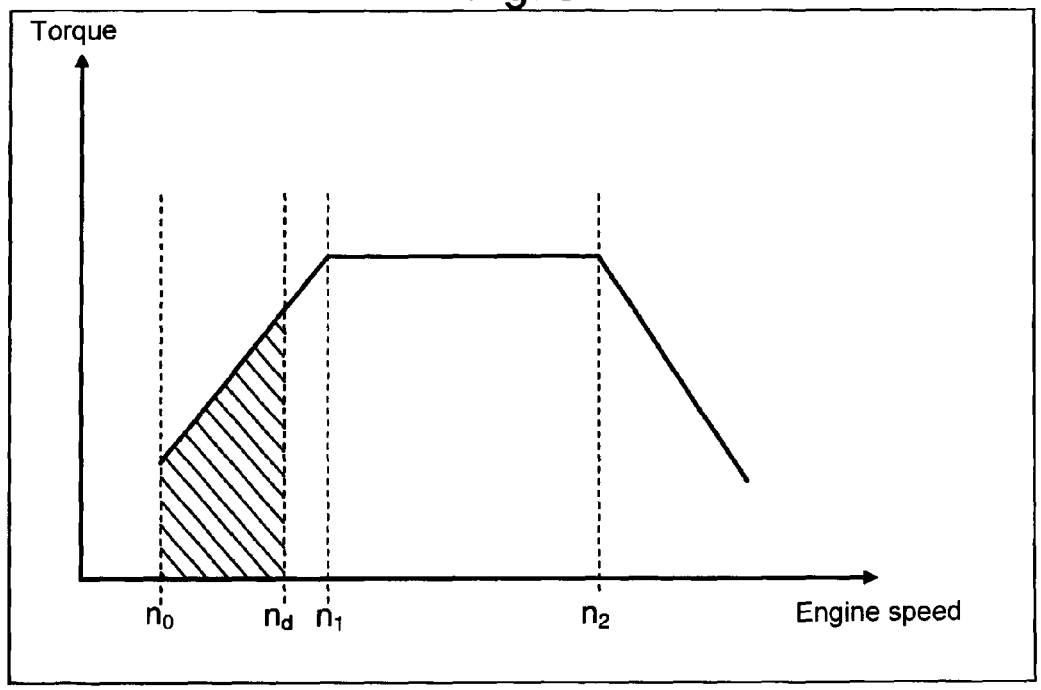
FIG. 3 depicts a torque curve for an engine with indicated limits for an overdriven operating range.

FIG. 3 depicts a torque curve and operating range for an overdrive as described above. The engine speed $n_d$ denotes the engine speed at which the vehicle's cruising speed or maximum permissible speed is reached, with a maximum at $n_1$, so the engine will never run on the torque plateau (the region between n1 and n2) at vehicle cruising speed with overdrive engaged, but always at a lower engine speed and hence lower torque. The overdrive is thus intended to be used at an operating point below the torque plateau for the torque curve, and the operating point $n_d$ can in principle be shifted to any desired point between $n_0$ (a point where the engine can deliver positive torque) and $n_1$.

In a vehicle with conventional gear changing, the transmission ratios of the gearbox are so arranged that the engine speed at the vehicle's cruising speed will be in the upper part of the torque plateau (i.e. nearer to n2) or alternatively in the middle of the torque plateau (midway between n1 and n2) to achieve good drivability. The vehicle's cruising speed may vary depending on regional regulations or type of road but may for example be 80, 85 or 89 km/h.

The torque T and the power output P are related to one another by the equation $$P = T\omega \qquad (1)$$

where ω represents the engine's angular velocity, i.e. 2π60/rpm (where rpm=engine revolutions per minute), which means that the power output P which can be extracted from the engine in the region up to the speed $n_1$ is limited to a lower value than the maximum which the engine can deliver, since both the engine speed and the maximum torque deliverable by the engine are lower. The power output from the engine is thus limited when the overdrive is engaged.

If the vehicle is for example driven at a cruising speed of 80 km/h and the control unit 115 (or 116) determines that there is a low need for power output, e.g. by determination of the vehicle's running resistance, the overdrive can be engaged, resulting in the engine saving fuel. The running resistance at the time may be calculated from knowing the vehicle's running speed, the engine's driving torque, the vehicle's configuration and other ambient data. The running resistance is a total representation of the resultant of the headwind, tailwind, rolling resistance, friction and energy consumers in the vehicle and the force of gravity which accelerates/brakes the vehicle and can therefore be used as a representation of the road gradient.

When the overdrive is engaged as above, the engine will run at a low speed, within the range below the torque plateau depicted in FIG. 3, i.e. at a speed below n1. For example, the power output needed may be regarded as low if it is lower than a certain threshold value. The threshold value may for example be a proportion, e.g. 10-15%, of the maximum power output, or a proportion of the maximum available power output when running on overdrive.

Depending on the power output needed at the time to propel the vehicle, the engine can contribute the output required so long as it does not exceed the maximum which it can deliver at its speed at the time. For example, the vehicle may be driven with overdrive engaged on a downgrade which results in a reduced need for power output but is not steep enough to enable it to accelerate/maintain speed purely by gravity, in which case a certain contribution is required from the engine, e.g. 10-50 kW, for the vehicle speed to be maintained or substantially maintained.

How much power output can be delivered by the engine with overdrive engaged depends on where in the region between $n_0$ and $n_1$ the operating point $n_d$ is, since the torque (and hence the power output as above) varies greatly with the engine speed within the operating range at the time.

Instead of the engine delivering energy, an alternative possibility if the vehicle's running resistance is negative, i.e. if it is on a downgrade such that its speed is maintained or substantially maintained without fuel supply to the engine, is for the engine to be "trailed", with fuel injection switched off and consequently no fuel consumption.

Trailing the engine at low engine speed affords also the advantage that the braking torque which the engine applies to the drive shafts when the power train is closed will be far less than when trailing at higher engine speeds. This is exemplified in FIG. 4 for an example of a combustion engine where engine friction is plotted against engine speed. The engine friction depends at least partly on friction in bearings and sliding surfaces, and on energy consumed in pumping air, oil and water through the engine.

As may be seen in the drawing, the braking torque applied by the engine is almost twice as great at around 1800 rpm (250 Nm) as at 600 rpm (130 Nm). Since the engine's power output depends on both its torque and its speed, the difference in brake power output will be still greater (47 kW as against 8 kW). Trailing the engine at a lower engine speed thus makes it possible for the vehicle to be driven without fuel consumption with lower brake resistance and therefore to roll for a longer distance before positive torque is again required to propel the vehicle.

As mentioned above, an alternative solution in such a situation is for the engine to be disconnected altogether from the drive shafts so that no braking torque at all is applied from the engine, with still less rolling resistance. This solution does however involve the disadvantage of fuel being consumed all the time to keep the engine running.

Reverting to FIG. 2, when the overdrive is engaged, the method moves on to step 203 which determines whether a speed parameter for the vehicle fulfils a first criterion. This may for example take the form of determining whether the vehicle's running speed at the time deviates from a speed reference $H_{ref}$. This may for example be done by determining whether the speed change relative to the speed reference $H_{ref}$ is greater than or equal to a threshold value $H_{thres}$. $H_{thres}$ may for example be a percentage, e.g. 1, 2 or 5%, of the speed reference $H_{ref}$.

The threshold value may be absolute, i.e. irrespective of whether the speed difference is an increase or a decrease, or it may for example be only a decrease. The threshold value may for example also be an actual speed difference, e.g. 1, 2 or 5 km/h.

The threshold value may be absolute, i.e. irrespective of whether the speed difference is an increase or a decrease, or it may for example be only a decrease. The threshold value may for example also be an actual speed difference, e.g. 1, 2 or 5 km/h.

Alternatively, the speed parameter may for example be a derivative for the vehicle's running speed, in which case the speed change (the derivative) may be compared with a threshold value or reference value.

If the vehicle's speed does not differ from the speed reference $H_{ref}$ by more than said difference, or if for example the absolute amount of the derivative does not exceed a threshold value or deviate from a reference value by more than a specific amount, the process moves on to step 204 with overdrive engaged.

Step 204 determines whether there is any other reason for no longer driving the vehicle with overdrive engaged. If such is not the case, the process goes back to step 203, otherwise it moves on to step 205.

Figure 4:
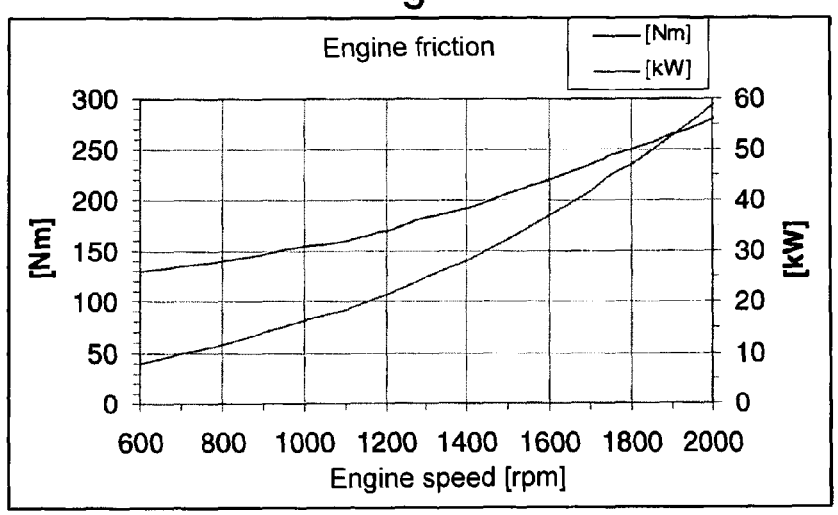
FIG. 4 depicts friction losses in an engine as a function of engine speed.

In contrast, if the speed difference at step 203 exceeds the threshold value $H_{thres}$ or if the derivative exceeds a threshold value or deviates from the reference value by more than a specific amount, the process moves on to step 205, where the gearbox changes down to a lower gear (a higher transmission ratio) to make more motive force available and thereby be able to accelerate the vehicle again to a higher speed, or alternatively, entirely according to FIG. 4, the downward gear change results in more trailing resistance which can be used for engine braking of the vehicle.

It is also possible to determine whether the vehicle's speed is higher or lower than the reference speed $H_{ref}$. If the vehicle speed is lower, i.e. if it deviates downwards by more than a threshold value $H_{thres}$, it is possible (in an undepicted step) to determine whether further power output can be extracted from the engine with overdrive still engaged. If such is the case, the power output increases and the process goes back to step 203. If on the contrary no further power output is available with overdrive engaged, the process moves on to step 205.

A speed decrease may for example be due to the downgrade levelling out or even changing to an upgrade. The process then reverts to step 201 in order once again to be able to change back up to overdrive if there is again a reduced need for motive force.

If the vehicle speed exceeds the reference speed (by more than said threshold value $H_{thres}$) the process can move on to a step (not depicted) where a braking torque is applied, e.g. by using the vehicle's service brake or by using, for example, exhaust brakes, retarder brakes etc., whereupon the process reverts to step 203, where the vehicle speed is again compared with a reference speed.

The process depicted in FIG. 2 comprises also a superordinate process, step 204. This makes it possible to monitor continuously whether there is any other reason for there to be an increased need for power output from the engine. For example, changing down to a lower gear (a higher transmission ratio) may for example take place when any of the following criteria is fulfilled: vehicle speed increasing to a level set for a cruise control function, vehicle driver moving the accelerator pedal or the brake pedal, vehicle accelerating past a set speed.

The running resistance was used above to determine whether there was a reduced need for motive force. According to an alternative example of an embodiment, data about the road ahead of the vehicle are used to determine whether reduced power output is sufficient to propel the vehicle. For example, data from a look-ahead (LA) function may be used to determine whether reduced power output is required.

If the control unit/s 115 and/or 116 have/has access to data about the topography about the road ahead of the vehicle, e.g. data from the vehicle's navigation system or from said LA function, these data may be used in determining whether there is a low need for motive force. For example, information about the gradient of the road is obtainable via the LA function. These data can then be used to determine whether power output is needed or soon will be needed. Thus it is possible at step 201 not only to determine whether there is a reduced need for power output but also whether there soon will be a reduced need for power output. Thus the overdrive can be engaged at an optimum time without any need to monitor engine signals in order to determine that there is a low need for power output. For example, the overdrive may be arranged to be engaged already before the vehicle reaches the crest of a hill, e.g. if it is already possible to determine beforehand that the vehicle will in any case accelerate to maximum permissible speed on the subsequent downgrade.

Similarly, a downward gear change may be effected before a need for power output actually arises if it is determined by the vehicle's LA function that it is approaching an upgrade.

The present invention is described above in relation to a conventional gearbox. However, the invention is also applicable in the case of other types of gearbox, e.g. CVT (Continuous Variable Transmission) gearboxes, so long as the vehicle can run at a transmission ratio in which when cruising it runs at an engine speed which is below the lowest speed for the torque plateau of that ratio.

In addition to the above advantages, the present invention has a further great advantage. Vehicles of the above type usually have an exhaust cleaning system to reduce emissions from the engine. However, these exhaust cleaning systems usually require a certain lowest temperature, e.g. 200° C., for them to function as desired. Nor will an engine which is trailed, i.e. not supplied with fuel, deliver warm exhaust gases to maintain the temperature in the exhaust cleaning system. On the contrary, air will be pumped all the time through the engine, and this relatively cold air will cool the exhaust cleaning system.

This cooling is directly related to the amount of air passing through the engine. Using said overdrive to run the engine at as low a speed as possible reduces the amount of air during trailing, and hence also the cooling of the exhaust cleaning system, with less need for supplementary warming of the exhaust cleaning system.

However, the present invention affords a further advantage. As explained above, it is important for exhaust cleaning that the temperature in the exhaust cleaning system be maintained at at least a certain level to make it possible to ensure that the system functions well. Although trailing in overdrive as above results in less cold air passing through the engine, and in the cooling therefore being slower, it may still happen, e.g. on a long downhill run, that the temperature of the exhaust cleaning system drops to an undesirably low level and therefore needs raising. This temperature rise is easy to achieve when running in overdrive according to the present invention.

As explained above, $P=T\omega$. This means that to produce a certain power output it is necessary to generate a higher torque at lower engine speeds. Consequently a larger amount of fuel has to be injected to achieve desired torque, and hence power output, than at higher speeds. This larger amount of fuel leads to a higher exhaust temperature, raising the temperature in the exhaust cleaning system and contributing to a more effective post-treatment. This is particularly advantageous in situations where running on overdrive still requires a certain power output for the vehicle not to lose momentum.

The fact that, owing to the low engine speed, the gas flow is small also means that the engine's efficiency will be high, making it possible for the exhaust cleaning system to be warmed in a cost-effective way. Thus according to an embodiment of the present invention the power output delivered when running on overdrive may be controlled not only by need for motive force but also by need for warming of the vehicle's exhaust cleaning system, thereby obviating other, less cost-effective, warming measures.

The vehicle's speed has so far been described in absolute terms, but it should be noted that it may also be described in other ways, e.g. by determination of the vehicle's total kinetic energy, which may be done by the vehicle's control system. This type of speed representation is regarded as comprised within the term "(vehicle) (running) speed" in the present description and claims and is therefore also covered by the attached claims.

As mentioned above, on downgrades the vehicle's engine may be disconnected from its powered wheels when no torque contribution is required to maintain the vehicle's speed. The present invention may be also be combined with such a procedure, in which case the vehicle is driven either in overdrive as above or with the engine disconnected from the vehicle's powered wheels, depending on which is deemed the more advantageous.

That solution is described in detail in the parallel Swedish patent application "FÖRFARANDE OCH SYSTEM FÖR FRAMFÖRANDE AV ETT FORDON II" (Swedish Application number 0950971-2, METHOD AND SYSTEM FOR DRIVING A VEHICLE) with the same applicant and filing date as the present application.

The invention claimed is:

1. A method for control of a gearbox of a vehicle wherein the gearbox is connected to a combustion engine of the vehicle and the gearbox can be set to a number of different transmission ratios, wherein the method is performed:
   when the vehicle is running in a low transmission ratio and at a speed of the engine below a minimum speed of the engine at which a maximum torque plateau for the low transmission ratio is reached, and when there is or will, within a predetermined time, be a reduced need for power output to propel the vehicle, the method comprising:
   determining a speed parameter for the vehicle; and
   switching the gearbox to a higher transmission ratio, which is higher than the low transmission ratio, when the speed parameter fulfills a first criterion.

2. A method according to claim 1, wherein determining the speed parameter is performed by comparing a speed of the vehicle with a reference speed.

3. A method according to claim 2, wherein the first criterion is fulfilled when the speed of the vehicle deviates from the reference speed by a threshold value.

4. A method according to claim 2, wherein the first criterion is fulfilled when the speed of the vehicle is below a first speed.

5. A method according to claim 1, wherein determining the speed parameter is performed by determining a change in a speed of the vehicle.

6. A method according to claim 5, wherein determining the change in the speed of the vehicle is performed by determining a derivative for the speed of the vehicle.

7. A method according to claim 5, wherein the first criterion is fulfilled when the change in the speed of the vehicle deviates from a threshold value.

8. A method according to claim 1, wherein, when the vehicle is running in a transmission ratio, which is higher than the low transmission ratio, determining if a first state exists in which there is or will within a predetermined time be a reduced need for power output for propulsion of the vehicle, and setting the gearbox to the low transmission ratio based on the determination of the existence of the first state.

9. A method according to claim 8, further comprising:
   determining if a second state exists in which there is or will within a predetermined time be a reduced need for engine power output below a threshold value for propulsion of the vehicle, and switching the gearbox to the low transmission ratio upon determining that the second state exists.

10. A method according to claim 8, further comprising determining that there is or will, within a predetermined time, be a reduced need for power output for propulsion of the vehicle based upon data concerning a gradient of a road ahead of the vehicle and/or data concerning topography of a road ahead of the vehicle.

11. A method according to claim 1, wherein control signals to and/or from the engine are used to determine if there is or will, within a predetermined time, be a reduced need for power output for propulsion of the vehicle.

12. A method according to claim 1, further comprising continuously monitoring whether there is and/or will be need for driving power from the engine and, if there is and/or will be such need, switching the gearbox to a higher transmission ratio.

13. A method according to claim 1, wherein the gearbox comprises a plurality of distinct gears, and switching to a lower/higher transmission ratio comprises changing the gearbox to a higher/lower gear.

14. A method according to claim 1, wherein the low transmission ratio comprises a gear or a transmission ratio setting for the gearbox at which the vehicle at its cruising speed or maximum permissible speed runs at a speed of the engine which is below the speed of the engine at which the torque plateau for the gear or the transmission ratio setting is reached.

15. A method according to claim 1, wherein determining the speed parameter for the vehicle is performed by use of a control system of the vehicle, and the method further comprises determining a timing for setting the gearbox to a transmission ratio which is higher than the low ratio by use of the control system on the basis of the determined speed parameter.

16. A non-transitory computer-readable medium containing computer instructions stored therein for causing a computer processor to apply a method for control of a gearbox of a vehicle wherein the gearbox is connected to a combustion engine of the vehicle and the gearbox can be set to a number of different transmission ratios, wherein the method is performed:
   when the vehicle is running in a low transmission ratio and at a speed of the engine below a minimum speed of the engine at which a maximum torque plateau for the low transmission ratio is reached, and when there is or will, within a predetermined time, be a reduced need for power output to propel the vehicle, the method comprising:
   determining a speed parameter for the vehicle; and
   switching the gearbox to a higher transmission ratio, which is higher than the low transmission ratio, when the speed parameter fulfills a first criterion.

17. A system for control of a gearbox of a vehicle wherein the gearbox is connected to a combustion engine and the gearbox can be set to a number of different transmission ratios, the system comprising:
- a speed determining device configured to determine a speed parameter for the vehicle; and
- a device configured to switch the gearbox to a transmission ratio which is higher than a low transmission ratio when the speed parameter fulfills a first criterion,
- the system being configured to run the vehicle in the low transmission ratio and at a speed of the engine below a minimum speed of the engine at which a maximum torque plateau for the low transmission ratio is reached when there is or will, within a predetermined time, be a reduced need for power output to propel the vehicle.

18. A vehicle comprising:
- a gearbox of the vehicle wherein the gearbox is connected to a combustion engine and the gearbox can be set to a number of different transmission ratios;
- a speed determining device configured to determine a speed parameter for the vehicle; and
- a device configured to switch the gearbox to a transmission ratio which is higher than a low transmission ratio when the speed parameter fulfills a first criterion, wherein
- the vehicle is configured to run in the low transmission ratio and at a speed of the engine below a minimum speed of the engine at which a maximum torque plateau for the low transmission ratio is reached when there is or will, within a predetermined time, be a reduced need for power output to propel the vehicle.

* * * * *